US012299504B2

(12) United States Patent
Tan et al.

(10) Patent No.: US 12,299,504 B2
(45) Date of Patent: May 13, 2025

(54) METHODS AND APPARATUS TO EXPOSE A MICROSERVICE TO A SOFTWARE LAYER

(71) Applicant: ALTERA CORPORATION, San Jose, CA (US)

(72) Inventors: Tat Kin Tan, Bayan Lepas (MY); Kamarul Zaman Abdul Rashid, Georgetown (MY)

(73) Assignee: ALTERA CORPORATION, San Jose, CA (US)

( * ) Notice: Subject to any disclaimer, the term of this patent is extended or adjusted under 35 U.S.C. 154(b) by 630 days.

(21) Appl. No.: 17/485,351

(22) Filed: Sep. 25, 2021

(65) Prior Publication Data

US 2022/0012106 A1    Jan. 13, 2022

(51) Int. Cl.
*G06F 9/54* (2006.01)
*G06F 8/41* (2018.01)
*G06F 9/445* (2018.01)

(52) U.S. Cl.
CPC ............. *G06F 9/541* (2013.01); *G06F 8/44* (2013.01); *G06F 9/44505* (2013.01)

(58) Field of Classification Search
None
See application file for complete search history.

(56) References Cited

U.S. PATENT DOCUMENTS

2003/0208638 A1* 11/2003 Abrams, Jr. ............ H04L 69/40
                                                           348/575
2022/0046019 A1*  2/2022 Satyanarayana ........ H04L 67/34

OTHER PUBLICATIONS

Wikipedia, "Make (software)," URL:[https://en.wikipedia.org/w/index.php?title=Make_(software)&oldid=1044456440], last edited Sep. 15, 2021, retrieved Jan. 18, 2024, 14 pages.
European Patent Office, "Communication Pursuant to Article 94(3) EPC," issued in connection with European Patent Application No. 22184660.3-1203, dated Jan. 24, 2024, 7 pages.
European Patent Office, "European Search Report," issued in connection with European Appl. No. 22184660.3, dated Dec. 23, 2022, 11 page.
James Mcgovern et al., "Java Web Services Architecture (The Morgan Kaufmann Series in Data Management Systems)", Elsevier B.V., ISBN 978-1-55860-900-6, May 12, 2003, 837 pages.
"Information Technology—Reference Architecture for Service Oriented Architecture (SOA RA)—Part 2: Reference Architecture for SOA Solutions," ISO/IEC 18384-2:2016, Jun. 27, 2016, 202 pages.
"TCG Feature API (FAPI) Specification," Jun. 11, 2020, 67 pages, retrieved from: https://trustedcomputinggroup.org/wp-content/uploads/TSS_FAPI_v0p94_r09_pub.pdf.
European Patent Office, "Communication pursuant to Article 94(3) EPC," issued in connection with European Patent Application No. 22184660.3-1203, dated Mar. 3, 2025, 10 pages.

(Continued)

*Primary Examiner* — Craig C Dorais
(74) *Attorney, Agent, or Firm* — Hanley, Flight & Zimmerman, LLC

(57) ABSTRACT

Methods, apparatus, systems and articles of manufacture disclosed herein expose a microservice to a software layer. A disclosed method includes composing an API execution recipe, initializing a software service to be called, and checking, by executing an instruction with the at least one processor. The connection is between a software layer and a microservice, is defined by the API execution recipe, and is to expose the microservice to the software layer.

24 Claims, 9 Drawing Sheets

(56) References Cited

OTHER PUBLICATIONS

Anonymous, Microservices: "Microservices—Wikipedia", Sep. 21, 2021 (Sep. 21, 2021), XP093253208, retrieved from the Internet at URL: https://en.wikipedia.org/w/index.php?title=Microservices&oldid=1045625935, 11 pages.

* cited by examiner

FIG. 6

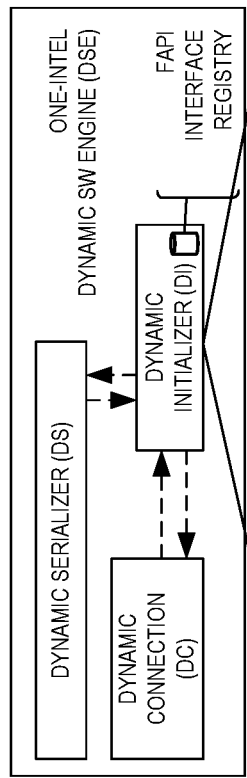

| | | |
|---|---|---|
| 1 | query{*intel_get_random*} | //DI: query request to the registry triggered by the user, i.e. drag-drop |
| 2 | private_return {fapi_object: } | //DI: return results from the registry with an array of FAPI objects |
| 3 | private_return {sapi_object: } | //DI: return result of the corresponding SAPI objects for the FAPI(s) |
| 4 | compose_sw_recipe{fapi_object, sapi_object} | //DI: composition of the SW execution recipe |
| 5 | public_return {recipe_intel_get_random} | //DI: final result returned to the IDE, i.e. SW recipe |

METHODS AND APPARATUS TO EXPOSE A MICROSERVICE TO A SOFTWARE LAYER

FIELD OF THE DISCLOSURE

This disclosure relates generally to microservices and, more particularly, to methods and apparatus to expose a microservice to a software layer.

BACKGROUND

In recent years, silicon developers are offering chipsets that have built in microservices. Such microservices, depending on design, provide a chipset with additional capabilities/features, thereby eliminating the need to purchase additional hardware or additional software for such capabilities.

BRIEF DESCRIPTION OF THE DRAWINGS

FIG. 6 is pseudocode that can be used to implement the dynamic initializer of FIG. 4.

Figure 1:
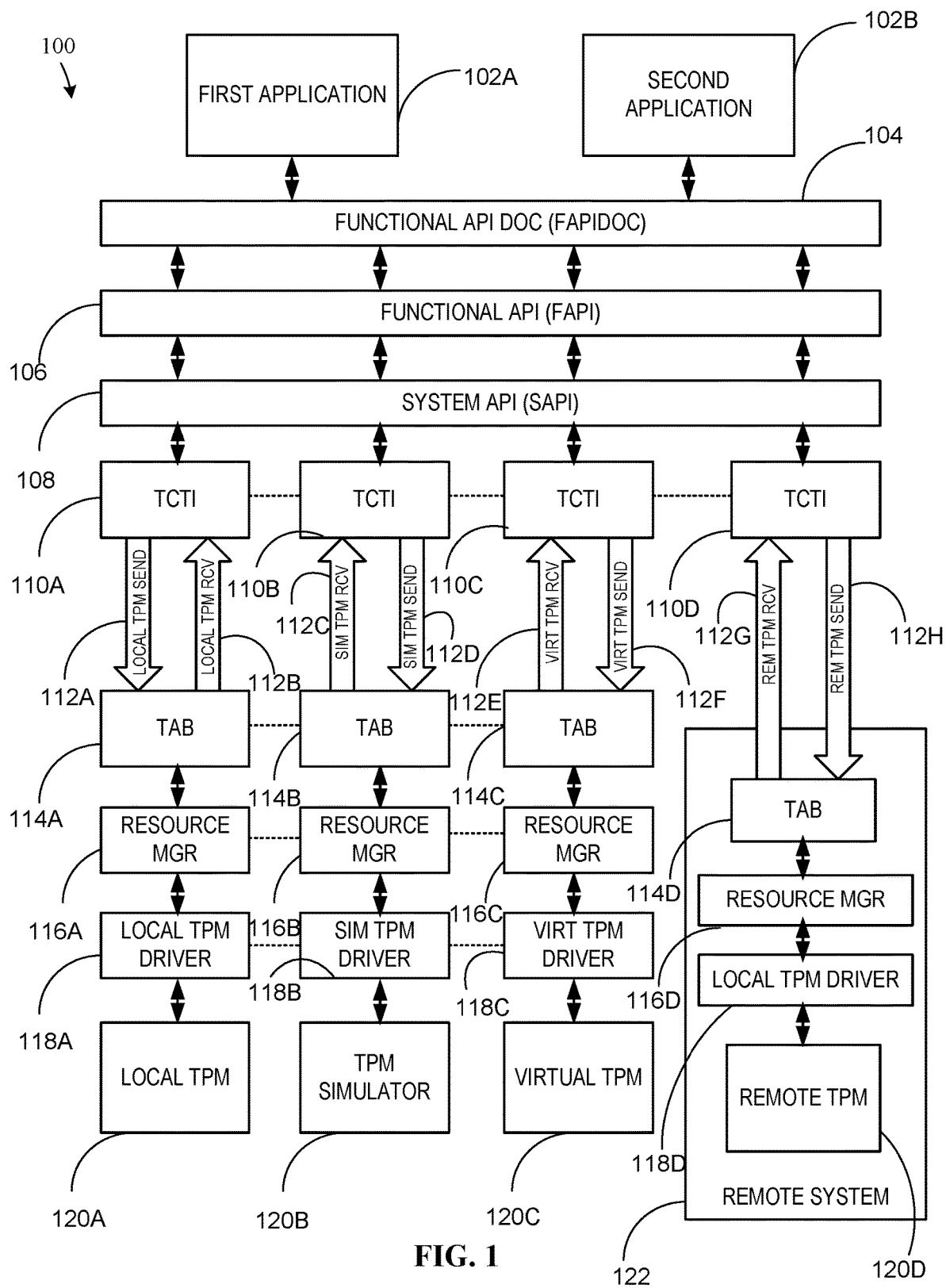
FIG. 1 is a block diagram a TPM stack/architecture.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Any or all of a hardware module, a hardware end point, soft intellectual property (IP), and/or hard IP features can be included in modern silicon designs. Further, the hardware module, hardware endpoint, and/or soft IP features perform an application specific feature/service (e.g., a hardware accelerator). In some cases, chipset providers license silicon blocks (e.g., hard IP, Soft IP, etc.) that incorporate the application specific feature/service.

When a software developer is writing an application and determining that the application is to have access to the specific hardware feature/service, the software developer derives/determines a path between the hardware layer (at which the specific hardware feature/service resides) and a software upper layer (such as, for example, an operating system layer). Once derived, the path is used to establish a connection between the specific hardware feature/service and the software application.

Unfortunately, a great deal of effort and detailed knowledge is required on the part of the software developer to derive such a path. The required effort coupled with limited time resources often cause software developers to forego using the specific hardware feature and, as a result, many such features are underutilized.

FIG. 1 is a block diagram of an example TPM stack/architecture 100. The block diagram of FIG. 1, and the description thereof, is intended to provide a better understanding of typical components and devices that lie between a software application of the TPM stack/architecture 100 and hardware of the first TPM stack/architecture 100. The example first TPM stack/architecture 100 of FIG. 1 includes an example first application 102A, an example second application 102B, an example functional application interface doc (FAPIDOC) 104, an example functional application interface FAPI 106, an example system application interface (SAPI) 108, four example trusted command transmission interfaces (also referred to as TCTIs) 110A, 110B, 110C, 110D, eight communication pathways 112A, 112B, 112C, 112D, 112E, 112F, 112G, 112H, four trusted platform module (TPM) access brokers represented as a first TAB 114A, a second TAB 114B, a third TAB 114C, and a fourth TAB 114D, four resource managers (RM), denoted a first RM 116A, a second RM 116B, a third RM 116C, and a fourth RM 116D, four TPM drivers 118A-D (including a local TPM driver 118A, a simulator TPM driver 118B, a virtual TPM driver 118C, and a remote TPM driver 118D) and four TPMs (including a local TPM 120A, a TPM simulator 120B, a virtual TPM 120D and a remote TPM 120D). In some examples, the remote TMP 120D is included in a remote system 122 that further includes the TAB 114D, the remote resource manager 116D, and the remote TPM driver 118D.

Thus, as illustrated in the example TPM stack/architecture 100 of FIG. 1, the TPM stack/architecture 100 may include multiple TPMs (e.g., the local TPM 120A, the TPM simulator 120B, the virtual TPM 120D, the remote TPM 120D, etc.). In this example, the TPMs represent the hardware feature/service to be exposed to a software interface accessible via the first application 102A and/or the second application 102B. Further, multiple components of the TPM stack/architecture 100 (e.g., the example FAPI doc 104, the example FAPI 106, the example SAPI 108, one of the example TCTIs 110A-110D, one of the example communication pathways 112A-112D, one of the example TPM access brokers (TAB 114A-114D), one of the example resource managers 116A-116D, and one of the example drivers 118A-118D) are between the software application (e.g., the first application 102A, the second application 102B, etc.) executing on the TPM stack/architecture 100 and the TPMs (e.g., the local TPM 120A, the TPM simulator 120B, the virtual TPM 120D, the remote TPM 120D, etc.).

Today, software developers creating software programs typically use integrated design environments (IDEs) (e.g., software development tools) in modeling compute/processing systems to write and test the software programs. Integrated design environments (offered by various manufacturers) typically provide comprehensive facilities for software development including, for example, a source code editor, build automation tools, a debugger, a compiler, an interpreter, etc. As described above, when creating a software program (e.g., the first application 102A or the example second application 102B), a software developer may determine that the software program/application 102A, 102B is/are to be provided access to (e.g., to be exposed to) a feature or specific function performed by any of the TPMs (e.g., the local TPM 120A, the TPM simulator 120B, the virtual TPM 120D, the remote TPM 120D, etc.) of the TPM stack/architecture 100 of FIG. 1. As further described above, to provide such access/exposure, the software developer manually derives a pathway between the applications (e.g., the first and/or second applications 102A, 102B) and a desired one of the TPMs.

In some examples, deriving the path between the software application (e.g., the first and/or second applications 102A, 201B) and the hardware feature/function of the desired one of the TPMs 120A-120D includes using firmware to reveal the hardware interface of the hardware feature/function, to update the firmware with a software driver (e.g., via encapsulation of the firmware) so that the hardware feature/function can be recognized by a software layer (e.g., a SAPI or a FAPI). (Encapsulation of the firmware refers to the act of wrapping a feature in or more software layers so that the corresponding hardware feature/function can communication with a software layer.) These acts enable communication between the various layers of hardware and software. Such acts (to name but a few) can include identifying all software libraries needed to create the pathway, identifying all software and hardware drivers needed to create the pathway, resolving all software dependencies between the various software layers, etc. Once the hardware is coupled to the FAPI via the pathway derived by the software developer, the pathway is coded as software executable codes. The software executable codes are provided to an integrated design environment for compilation. The resulting machine executable binary code can then be included in the software application (e.g., the first and/or second applications 102A, 102B) being developed and thereby provide the software application with access to the hardware function/feature (e.g., also referred to herein as a microservice) when installed on any compute system having a same hardware platform as the modeling system.

Figure 2:
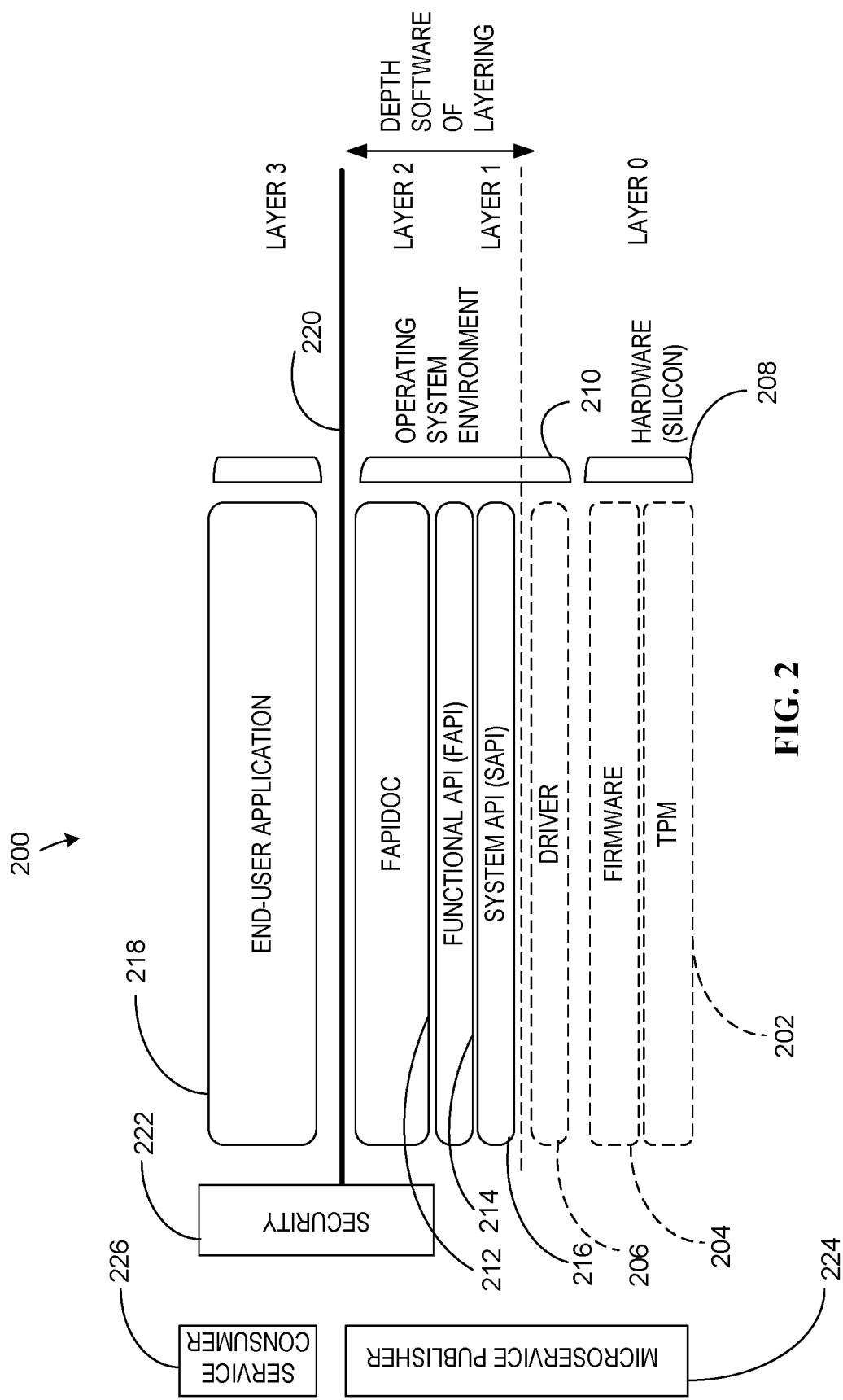
FIG. 2 is a diagram of layers of a microservices provisioning building block.

FIG. 2 depicts example hardware and software layers 200 of an example microservices provisioning building block 200. The system layers extend from an end user application to a hardware implemented TPM. In the microservices provisioning building block 200 of FIG. 2, a lowest layer, denoted layer 0, includes an example TPM 202, example firmware 204, and an example driver 206. As shown, the TPM 202 and firmware 204 are implemented in example hardware (silicon) 208, whereas the driver 206 is included as part of an operating system environment 210. Further, first and second intermediate layers, denoted layer 1, and layer 2, are also included as part of the operating system environment 210. The operating system environment 210 includes an example functional API doc (FAPIDOC) 212, an example functional API (FAPI) 214, and an example system API 216. An example end-user application 218 resides at a topmost layer, denoted layer 3. An example security boundary 220 provided by an example security tool 222 lies between the layer 3 and layers 0, 1, and 2 to secure and control access rules that authorize specific users/processes to the FAPI/SAPI layers 0-2. In addition, a microservice provider/publisher 224 supplies information that is used by, for example, software developers, to make an example microservice residing at layer 0 (e.g., the example TPM 202) available to the end-user application of layer 3 (operated by a service consumer 226).

Referring still to FIG. 2, providing the example end-user application 218 with access to the example hardware feature (e.g., the TPM 202), a pathway needs to be designed/derived to enable connection between the example TPM 202 and the example end-user application 218. The pathway is designed to expose a feature/functionality of the example TPM 202 to the software program (e.g., the end-user application 218). However, as further described above with reference to FIG. 1, manually deriving such a pathway is a complicated and complex task requiring significant effort, knowledge, and time, thereby causing hardware features (e.g., the TPM 202) to be under-utilized.

In contrast, the methods and apparatus disclosed herein dynamically (at run time or at near run time) expose a hardware function/feature (also referred to as a hardware microservice) to any or all of a variety of software development tools (which can be represented as the example end-user application 218 (of FIG. 2). Example methods and apparatus disclosed herein also provide an apparatus by which to dynamically prepare an application programming interface (API) execution recipe in a software environment. The API execution recipe, when executed, provides a pathway by which a hardware interface is exposed (e.g., by which a hardware feature is exposed to a software layer). In some examples, in response to a request to make a hardware microservice available to a software development tool, a backend software engine, referred to herein as a dynamic software engine (DSE) (e.g., the dynamic software engine 302 illustrated in and described with respect to FIG. 3 below), extracts an API execution recipe from a registry of API execution recipes. The API execution recipe is used later to build a pathway between a software application and the feature/functionality of a hardware block (or a soft IP block, a hybrid IP block, etc.) such that the feature/functionality (e.g., microservice) of the hardware block is accessible to the software application via the FAPI. The API execution recipe is software code that, when instantiated and imported as a reference into an integrated development environment, exposes the microservice to the software development tool (e.g., an IDE) via a unified single interface API. In some examples, the same interface exposure pathway can be used by any of a variety of different software development tools (IDEs) that may be developed by a variety of different entities. Thus, the methods and apparatus disclosed herein are able to dynamically expose a hardware microservice to any or all software development tools and thereby provide a developer-friendly, universal solution to making a hardware microservice available to a software development tool.

In addition, the methods and apparatus disclosed herein resolve the aforementioned challenges of manually deriving a pathway between a software layer and a hardware microservice by introducing an intelligent engine (e.g., the dynamic software engine 302 of FIG. 3 below) that can dynamically evolve or orchestrate an API execution recipe and adjust the depth of software layers needed to expose a hardware feature/function interface to software application. The methods and apparatus disclosed herein provide for the discovery of functional application interfaces (FAPIs) and corresponding system application interface (SAPIs) from a registry having FAPIs and corresponding SAPIs supplied by one or more registries of a federation of registries.

Figure 3:
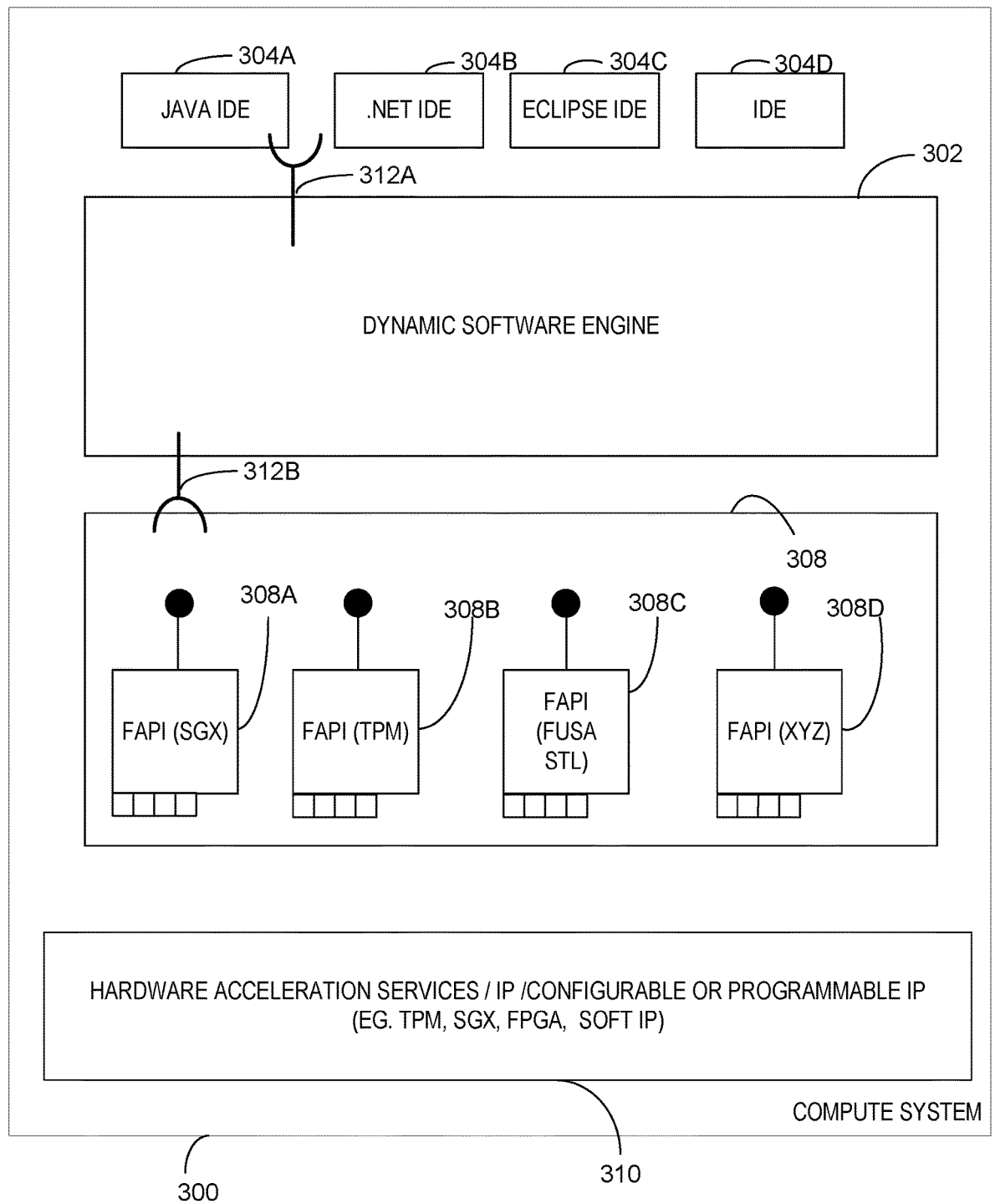
FIG. 3 is a block diagram of a TPM stack/architecture having a dynamic software engine to expose a microservice to a software layer of the hardware stack/architecture in accordance with the teachings disclosed herein.

FIG. 3 is a block diagram of an example third hardware stack/architecture 300 including a dynamic software engine 302 in accordance with the teachings disclosed herein. In some examples, the third hardware stack/architecture 300 includes example integrated development environment (IDE) tools (denoted the 1st IDE 304A, the 2nd IDE 304B, the 3rd IDE 304C, the 4th IDE 304D, etc.). Four IDEs are shown in FIG. 3, though any number of IDE tools may be included in the third hardware stack/architecture 300. In some examples, the four IDEs (e.g., 1st IDE 304A, 2nd IDE 304B, 3rd IDE 304C, 4th IDE 304D) are commercially available IDE tools. In some examples, any of the IDEs may be implemented using a JAVA IDE, a NET IDS, an ECLIPSE IDE or any other IDE. The third hardware stack/architecture 300 of FIG. 3 also includes the dynamic software engine (DSE) 302, also denoted DSE 302, an example set of functional application interfaces (FAPIs) denoted the 1st FAPI 308A, the 2nd FAPI 308B, the 3rd FAPI 308C, the 4th FAPI 308D, etc., and an example hardware block 310 (although referred to as a hardware block, the hardware block 310 can instead be implemented as a hard IP, a soft IP, a configurable or programmable IP, etc.). In some examples, the hardware block 310 is implemented using a Trusted Platform Module, a Software Guard Extension (SGX), a functional safety software test library (FuSA STL), etc. In some examples, the FAPIs (e.g., the 1st FAPI 308A, the 2nd FAPI 308B, the 3rd FAPI 308C, the 4th FAPI 308D, etc.) are implemented in the operating system environment (e.g., layer 1 and layer 2 of FIG. 2). In some examples, the dynamic software engine DSE 302 exposes the IDEs 304A-304D to the hardware interfaces FAPIs 308A, 308B, 308C, 308D. In some examples, the dynamic software engine 302 is able to connect ones of the IDEs 304A-304D to ones of the hardware interfaces FAPIs 308A-308D based on the desired microservice/feature and the hardware that implements the microservice/feature.

Figure 4:
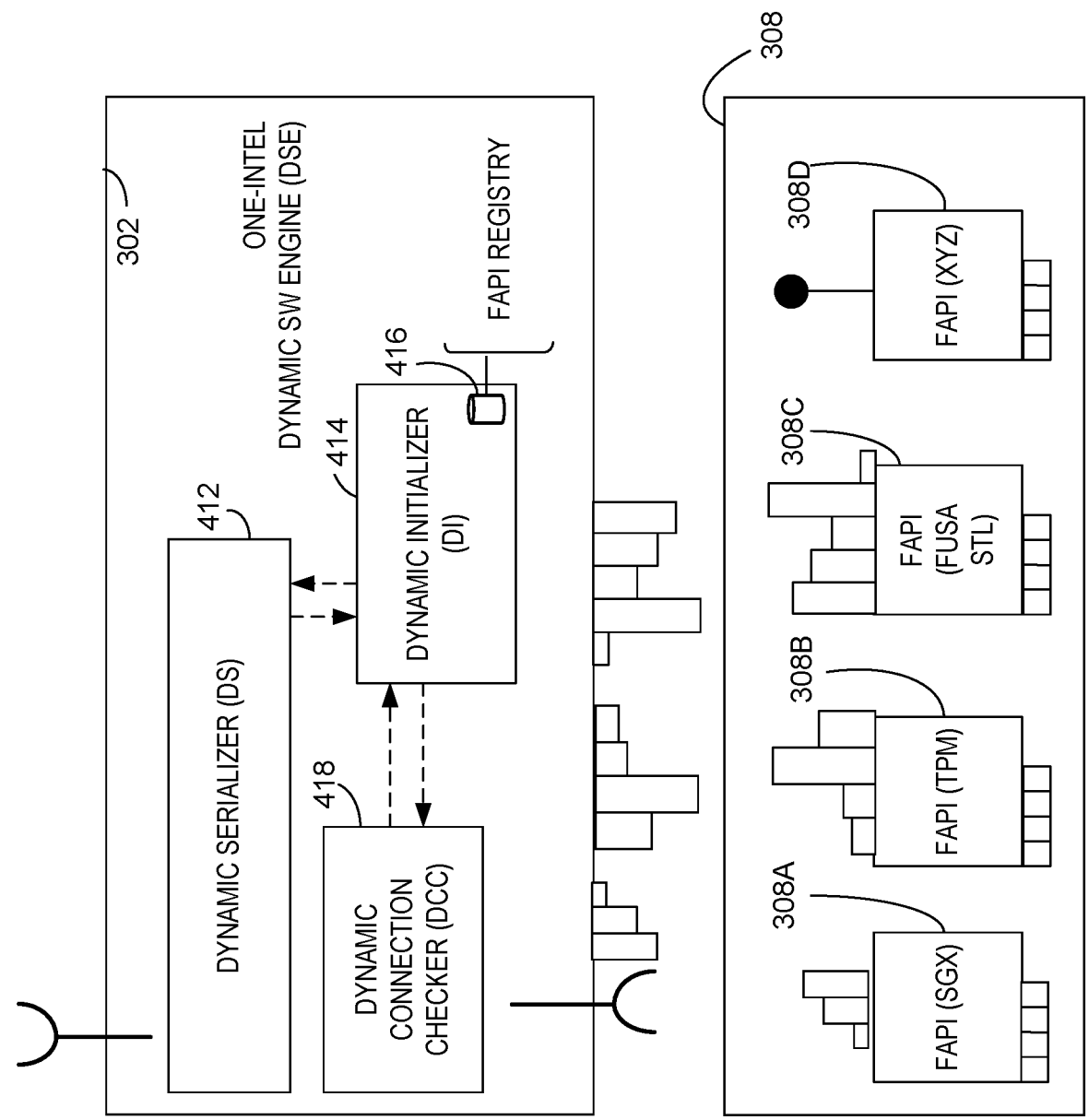
FIG. 4 is a block diagram of the dynamic software engine of FIG. 3 which includes a dynamic initializer.

FIG. 4 is a block diagram of the example dynamic software engine DSE 302 and the example FAPIs (e.g., the 1st FAPI 308A, the 2nd API 308B, the 3rd FAPI 308C, the 4th FAPI 308D, etc.). In some examples, the dynamic software engine DSE 302 includes an example dynamic serializer 412, also denoted DS 412, an example dynamic initializer 414, also denoted DI 414, an example FAPI interface registry 416, and an example dynamic connection checker/verifier 418. In some examples, the FAPI interface registry 416 is provided by or associated with one or more registry federations. In some examples, the registry 416 stores/contains information about FAPI interfaces and corresponding underlying execution recipes associated with different microservices and associated with different types of hardware. In some examples, information for a FAPI includes a microservice execution recipe (also referred to herein as an API execution recipe) corresponding to a microservice (also referred to as feature/functionality of a hardware block, soft IP, etc.). In some examples, a different FAPI is included for each microservice associated with a different manufacturer hardware. In some examples, FAPI information is included for each manufacturer of the hardware-embedded microservice. In some examples, third party entities can supply FAPI information to be included in the registry.

In some examples, as new manufacturer hardware devices providing different hardware features are offered on the market, corresponding different FAPIs are developed to enable the microservices. The manufacturer of the hardware generates information identifying the hardware, the microservice provided by the hardware, and the corresponding FAPI by which the hardware microservice can be exposed to a software application (e.g., an IDE residing at a software layer of the TPM hardware stack/architecture (e.g., see FIG. 2 and FIG. 3)). The information is supplied to the federation of registries which causes the registry 416 (FIG. 3) to be updated. In some examples, the generated information is delivered in a synchronized fashion in real-time or near real-time to all registries associated with the federation. Thus, the dynamic software engine DSE 302 uses the information stored in the registry 416 to expose a hardware interface of a microservice to an IDE as described further below. As such, a software developer wishing to access a microservice offered on a particular hardware, need only look to an IDE (see FIG. 3) to access the microservice.

In some examples, a request entered via any of the IDEs (e.g., the 1st IDE 304A, the 2nd IDE 304B, the 3rd IDE 304C, and/or the 4th IDE 304D) indicates that a hardware feature/microservice (e.g., a random number generator or any other hardware feature/microservice) is to be made available to the IDE at which the request was made. The hardware that implements the feature/microservice (e.g., the hardware installed in a modeling compute system having the hardware stack/architecture 300) can be any of a Trusted Platform Module (TPM) hardware architecture, a Software Guard Extension (SGX), a functional safety software test library (FuSA STL), etc.

The request generated by a corresponding one of the example IDEs 204A-304D is supplied to the example dynamic serializer DS 412. In some examples, the dynamic serializer DS 412 collects (or receives) information concerning the request including, for example, the hardware feature/microservice being requested, the identity of the IDE that generated the request, etc. The dynamic serializer DS 412 supplies the identity of the hardware feature/microservice to be accessed and, in some examples, the identity of the hardware that hosts the feature/microservice to the example dynamic initializer 414. In some examples, the dynamic serializer 412 DS identifies FAPI(s) and SAPIs to be used (or otherwise associated with the microservice to which access is being requested) and serializes the FAPI(s) and corresponding SAPIs before providing them to the example dynamic initializer DI 414.

In some examples, responsive to the request for access to the hardware feature/microservice, the example dynamic initializer DI 414 searches its internal instrumentation (e.g., the registry). In some examples, the dynamic initializer DI 414 accesses an internal list that enumerates a list of references and software dependencies that may arise when an attempt is made to call the serialized FAPI(s) and corresponding SAPIs identified by the dynamic serializer DS 412. In some examples, the registry 416 represents the internal list and, thus, the dynamic initializer DI 416 queries the registry to understand which software dependencies are needed. In response, a query result in a form of an API execution recipe is returned. The API execution recipe recognizes all the software drivers and software libraries and software services needed to expose the hardware feature/microservice to the software layer. In some examples, an array of FAPIs and SAPIs are returned in response to the query and the feature/microservice execution recipe is based on the array of FAPIs and the array of SAPIs.

As described above, the example dynamic initializer DI 414 receives the request information from the dynamic serializer DS 412 and uses the request information to fire/trigger a query of the FAPI interface registry 416. The query seeks to locate (in the FAPI interface registry 416) microservices and corresponding, inherent execution recipes that can be used to expose (make accessible) the requested feature/microservice to the FAPI software layer for access by the IDEs. The feature/microservice execution recipes being sought are directed to accessing/exposing the feature/microservice available on the particular hardware platform of the modeling computer to the IDEs, that is, the feature/microservice execution recipes are associated with the particular hardware platform of the modeling computer (assuming at the time of the request, the modeling computer only has access to hardware feature of one manufacturer).

In some examples, the resulting microservice recipe can include an execution duration, a latency value, a depth (e.g., number) of software layers to be traversed to gain the desired access, a list of any software dependencies between the layers, information identifying any dependent software libraries to be resolved, the sizes of software drivers to be used to enable access to the desired microservice, as well as any other information included in the registry that is needed to make the hardware feature/microservice available to the user application. In some examples, the dynamic initializer 414 uses the feature/microservice execution recipe to identify software services needed to expose the hardware feature and then initializes the software services and provides handshake protocols to enable communication between the microservices and/or other software services needed to expose the hardware feature.

In some examples, the dynamic initializer DI 414 determines that, for the hardware platform on/in which the microservice resides, multiple layers of SAPIs are required. For example, the dynamic initializer DI 414 can determine that, when accessing the random number generator microservice on the TPM hardware, three such layers of SAPIs are required, including "Tss2_Sys_Startup," "Tss2_Sys_GetCapability," and "Tss2_Sys_GetRandom." In some such examples, the dynamic initializer DI 414 will query the registry 416 for information concerning all three SAPIs. In some such examples, the catalog of FAPIs and corresponding SAPIs in the registry are accessed during the query. In some examples, the results of the query include software services and corresponding execution recipes.

In some examples, results of the query are then used by dynamic initializer DI 414 to identify the software services execution recipes and to initialize the corresponding services. The dynamic initializer DI 414 also operates to order and optimize the software services to form the API execution recipe. In this manner, the dynamic initializer DI 414 composes the API execution recipe. The resulting API execution recipe is capable of recognizing all the software drivers and libraries needed to expose the hardware feature/microservice. The resulting API execution recipe additionally resolves all of the complex software (e.g., FAPI and/or SAPI) and driver dependencies that arise in exposing the hardware feature/microservice.

The API execution recipe composed/generated by the example dynamic initializer DI 414 is supplied to the example dynamic connection checker DCC 418 which uses the API execution recipe to identify the FAPIs, the SAPIs, the software libraries, and the software drivers to be used to make the microservice/feature accessible. The dynamic connection checker DCC 418 then uses the API execution recipe, the identified software libraries, the identified FAPIs and SAPIs, and the identified software drivers to check whether the equipment needed to expose the hardware feature/microservice are valid (are operating properly and available). If so, the dynamic connection checker DCC 318 notifies the dynamic initializer 414 that the recipe is valid. If not, then the dynamic software engine may return an error result to the request to access the microservice generated by the IDE.

In addition to supplying the hardware feature/microservice execution recipe to the example dynamic connection checker 418 and assuming the API execution recipe is deemed valid, the example dynamic initializer DI 414 supplies the feature/microservice execution recipe and any accompanying information to the example dynamic serializer DS 412. The dynamic serializer 412 uses the API (microservice/feature) execution recipe to generate software codes that are recognizable by the one of the IDEs 304A-304D of FIG. 3 to which the API execution recipe is to be delivered. In some examples, the dynamic serializer DS 412 generates multiple sets of software codes, each set recognizable by corresponding ones of the IDEs 304A-304D. The executable software codes supplied by the dynamic serializer DS 412 to corresponding ones of the IDEs 304A-304D are compiled by the receiving IDE to thereby generate executable binary code. The executable binary code, when installed in a system(s) that operates on a same hardware platform as the modeling computer system, exposes the feature/microservice to the software layer via the FAPIs (e.g., the FAPIs 308A-308D).

In some examples, operation of the example dynamic software engine 302 (described above) is triggered when an instantiation operation is invoked using one or more of the IDEs. In some examples, the desired hardware feature/microservice interface to be exposed to the IDEs appears on a display associated with a compute system having the hardware stack/architecture 300 (or having a different architecture) as a visual object. In some such examples, the act of instantiating can include a gesture that moves the visual object between two workspaces in, for example, the IDEs. The gesture can include a drag-and-drop, flip, swipe, swing, slide, grab, etc. As described above, when the instantiating gesture is performed, the dynamic software engine DSE 302 operates, as described above, to translate and transform the gesture into a codebase that can be compiled into executable binary by the IDEs.

Referring still to FIG. 4, in some examples, as the hardware module that provides the microservice varies by manufacturer, the hardware interface varies. As a result, the FAPIs used to expose the hardware interfaces vary. In some examples, the first FAPI (FAPI (SGX) 308A) is to expose a hardware microservice of an SGX hardware architecture, a second FAPI (FAPI (TPM) 308B) is to expose a microservice of a TPM hardware architecture, and a third FAPI (FAPI (FuSA STL) 308C) is to expose a microservice of a functional safety software library (FuSA STL). As illustrated, the first FAPI 308A includes a connection of three software layers to the microservice, the second FAPI includes a connection of four software layers to the microservice, and the third FAPI includes a connection of five software layers to the microservice. In some examples, the microservice being exposed by the first, second and third FAPIs interfaces performs a same functionality. Thus, the difference in software layers used to expose the microservice interfaces are different due to the different hardware interfaces of the microservice on the different hardware platforms/architectures. Also, as shown for visualization purposes, the dynamic connection checker DCC 418 of the dynamic software engine DSE 302 acts as a set of keys that correspond to the microservice interfaces (e.g., FAPI 308A-308C). The symbols representing layers depicted above corresponding ones of the FAPIs are shown in an upside down manner and extend downward from the dynamic software engine DSE 302.

While an example manner of implementing the dynamic software engine DSE 302 of FIG. 2 is illustrated in FIG. 3, one or more of the elements, processes, and/or devices illustrated in FIG. 4 may be combined, divided, re-arranged, omitted, eliminated, and/or implemented in any other way. Further, the example dynamic serializer DS 412, the example dynamic initializer 414, an example FAPI registry 416, the example dynamic connection checker DCC 418 and/or, more generally, the example dynamic software engine DSE 302 of FIG. 4, may be implemented by hardware alone or by hardware in combination with software and/or firmware. Thus, for example, any of the example dynamic serializer DS 412, the example dynamic initializer 414, an example FAPI registry 416, the example dynamic connection checker DCC 418 and/or, more generally, the example dynamic software engine DSE 302 of FIG. 4, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example dynamic software engine DSE 302 of FIG. 3 may include one or more elements, processes, and/or devices in addition to, or instead of, those illustrated in FIG. 4, and/or may include more than one of any or all of the illustrated elements, processes and devices.

Figure 7:
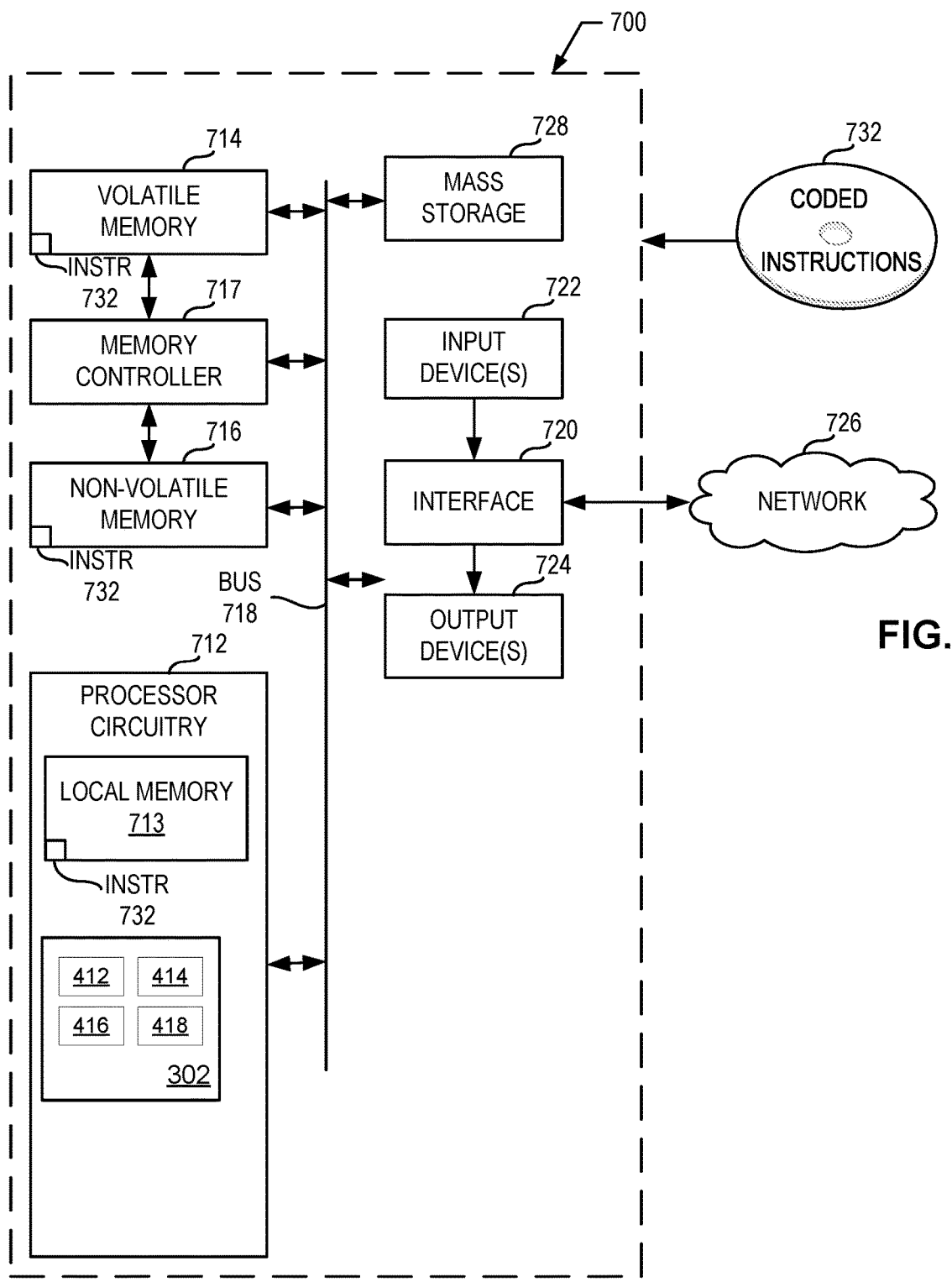
FIG. 7 is a block diagram of an example processing platform including processor circuitry structured to execute the example machine readable instructions of FIG. 5 to implement the dynamic software engine of FIG. 3.

A flowchart representative of example hardware logic circuitry, machine readable instructions, hardware implemented state machines, and/or any combination thereof for implementing the dynamic software engine 302 of FIG. 3 (and FIG. 4) is shown in FIG. 7. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example apparatus 50 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
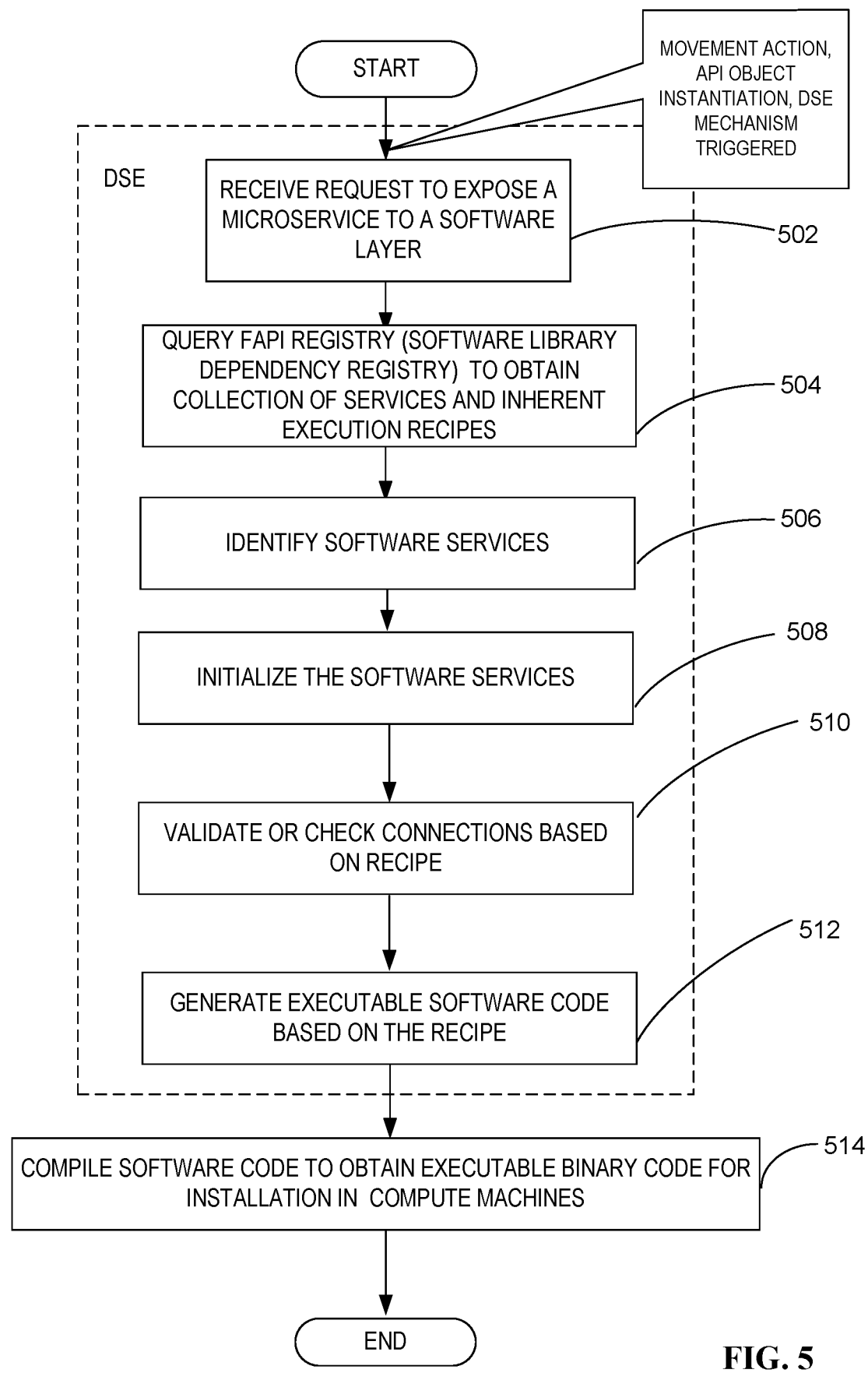
FIG. 5 is a flowchart representative of example machine readable instructions that may be executed by the dynamic software engine of FIG. 3.

FIG. 5 is a flowchart representative of example machine readable instructions and/or example operations 500 that may be executed and/or instantiated by processor circuitry to dynamically expose a microservice to a software layer of a hardware stack/architecture. The machine readable instructions and/or operations 500 of FIG. 5 begin at block 502, at which a request to expose a microservice interface is received. As described above, in some examples, the dynamic serializer receives the request from an IDE of the hardware stack/architecture. In some examples, the request takes the form an instantiation operation in which a software developer invokes the exposure of the microservice interface. In some examples, the instantiation can be formed by moving a visual object on a display from a first area or region of the display to a second region.

At a block 504, the dynamic initializer 414 (of FIG. 4) composes the API/microservice execution recipe. In some examples, the dynamic initializer 414 composes the API/microservice execution recipe by querying the registry (also referred to as the FAPI registry and/or as the software library dependency registry) for identities of a set services and inherent, corresponding execution recipes needed to expose the microservice/feature. In some examples, the recipe is composed based on an array of FAPIs and an array of SAPIs obtained from the registry. In response to the results of the query, the dynamic initializer 414 use the execution recipe to identify a set of services needed in order to expose the microservice a block 506. At a block 508, the dynamic initializer 414 initializes the services identified in the execution recipe in an order specified in the recipe.

At a block 510, the dynamic connection checker DCC 418 uses the selected feature/microservice (API) execution recipe to determine whether a pathway described by the recipe is valid. At a block 512, assuming the pathway is valid, the dynamic serializer 412 uses the API execution recipe generate executable code that is recognizable by the IDE(s) IDEs 304A-304D (FIG. 3) that requested access to the microservice. The IDE(s) compile the software executable code (developed from the API execution recipe) thereby resulting in executable binary code at the block 514. After the block 514, the machine readable instructions and/or example operations 500 of FIG. 5 end. In some examples, the binary codes can later be installed in and executed by processing systems to thereby expose the microservice interface be exposed to the software layer of the processing system. In some examples, the machine readable instructions and/or example operations 500 of FIG. 5 can be repeatedly re-executed from start to finish to expose as many microservice hardware interfaces as desired. In some examples, when the dynamic connection checker DCC 418 cannot validate the pathway, the dynamic initializer DI 414 is notified and an error message is returned to the IDEs.

FIG. 6 is pseudocode that can be used to implement the dynamic initializer 414 of FIG. 4. The pseudocode includes five operations, a FAPI return operation, a SAPI return operation, a compose sw recipe (e.g., feature/microservice execution recipe) operation and a return recipe operation. The pseudocode operations cause the actions described with respect to FIGS. 4 and 5 to be performed.

FIG. 7 is a block diagram of an example processor platform 700 structured to execute and/or instantiate the machine readable instructions and/or operations of FIG. 5 to implement the dynamic software engine of FIG. 3 and FIG. 4. The processor platform 700 can be, for example, a server, a personal computer, a workstation, a self-learning machine (e.g., a neural network), an Internet appliance, a DVD player, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example dynamic serializer 412, the dynamic initializer 414, and the example dynamic converter 418.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, redundant array of independent disks (RAID) systems, solid state storage devices such as flash memory devices, and DVD drives.

The machine executable instructions 732, which may be implemented by the machine readable instructions of FIGS. 500 may be stored in the mass storage device 728, in the volatile memory 714, in the non-volatile memory 716, and/or on a removable non-transitory computer readable storage medium such as a CD or DVD.

Figure 8:
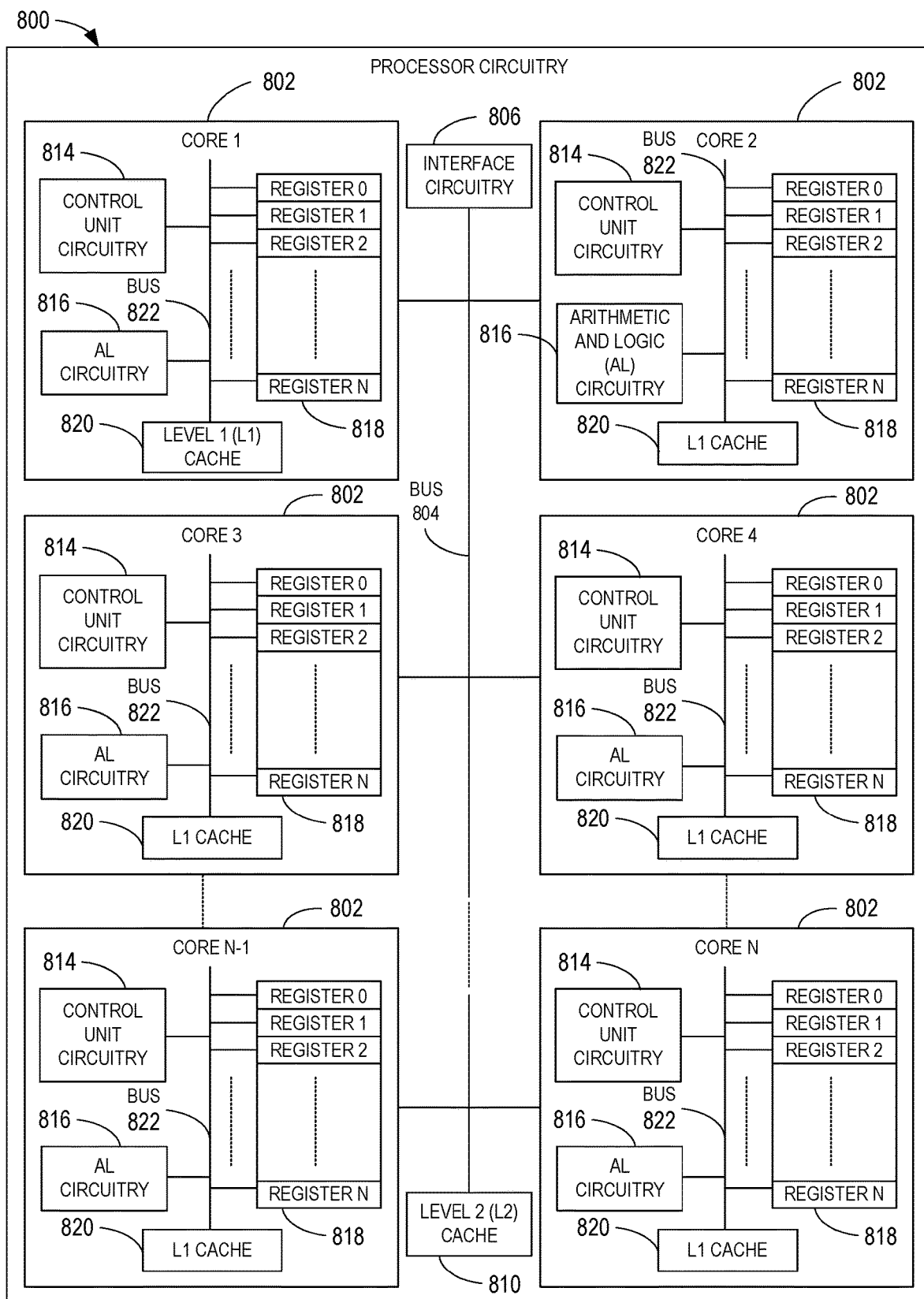
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 5.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally, or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
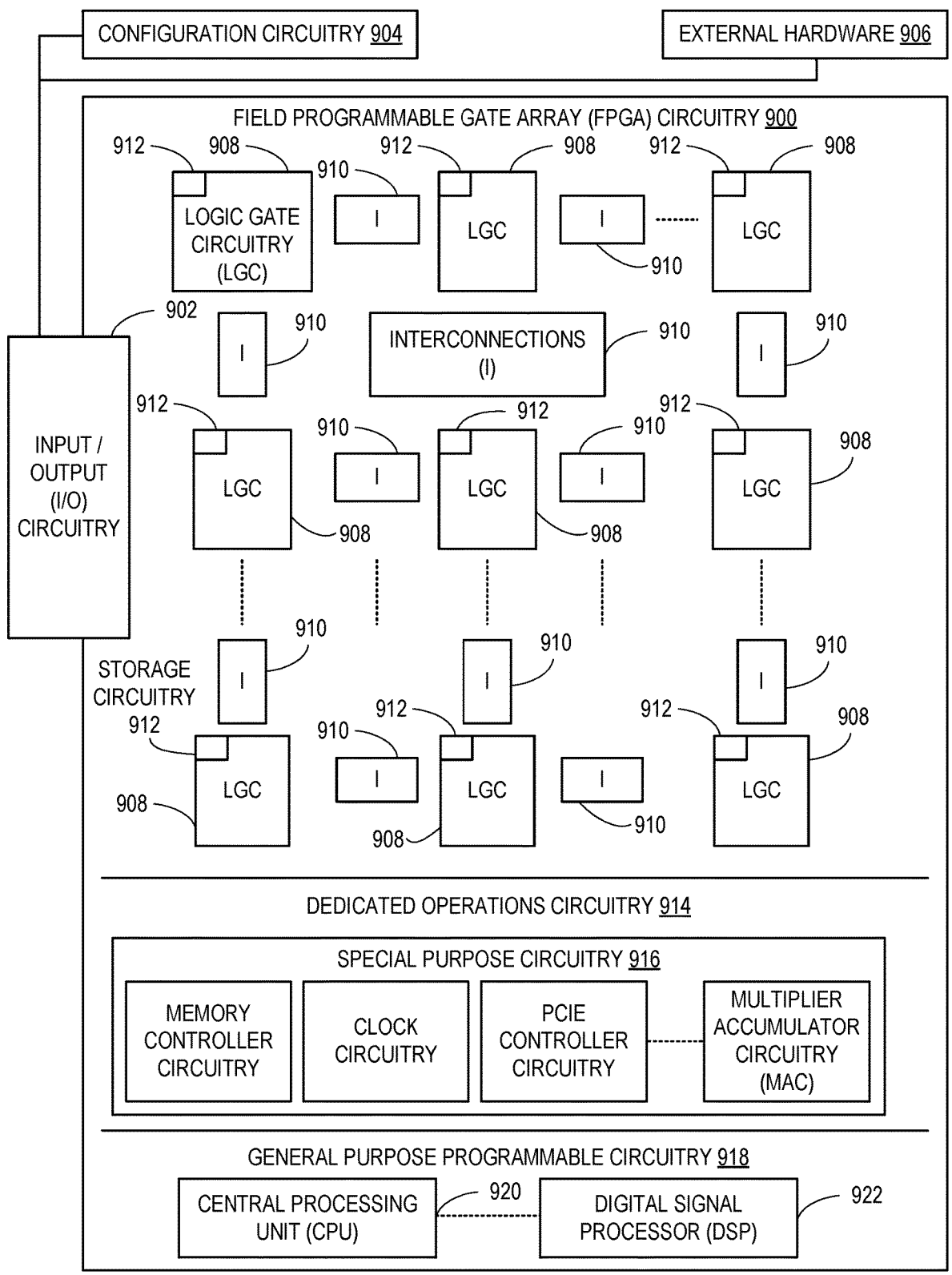
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 700 of FIG. 7 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 5. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some, or all of the software represented by the flowchart of FIG. 5 As such, the FPGA circuitry 900 may be structured to effectively instantiate some or all of the machine readable instructions of the flowchart of FIG. 9 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 9 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIG. 5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 5 may be executed by one or more of the cores 802 of FIG. 8 and a second portion of the machine readable instructions represented by the flowchart of FIG. 5 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 800 of FIG. 8 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that expose a hardware interface for a microservice to a software layer of a hardware stack/architecture of a compute/processor system. The disclosed systems, methods, apparatus, and articles of manufacture greatly improve ease of using hardware microservices by dynamically providing access to such hardware microservices. The disclosed systems, methods, apparatus, and articles of manufacture dynamically generate a software code based API execution recipe that, when compiled to binary code provides a software layer (e.g., the Functional API layer) of a hardware stack/architecture of a compute/processing system access to a hardware microservice. Generating access to hardware microservices using the dynamic engine disclosed herein eliminates the need to manually derive a pathway between a software layer and the hardware microservice. Deriving such a pathway, when performed manually, is labor intensive, time consuming and extremely difficult. Thus, using the dynamic software engine disclosed promotes the usage of hardware microservices that can often perform specific tasks more quickly and more efficiently than using software code to perform the same tasks.

Example methods, apparatus, systems, and articles of manufacture to expose a hardware feature/microservice to a software layer are disclosed herein. Further examples and combinations thereof include the following:

Example 1 includes a method comprising composing an API execution recipe, initializing a software service to be called, and checking, by executing an instruction with the at least one processor, a connection between a software layer and a microservice, the connection defined by the API execution recipe, and the connection to expose the microservice to the software layer.

Example 2 includes the method of example 1, further including querying a functional application programming interface (FAPI) registry to obtain a collection of software services and corresponding execution recipes, the composing of the API execution recipe to occur in response to the querying, the API execution recipe based on a collection of software services and corresponding execution recipes, and the software service to be called among the collection of software services, and identifying, based on the API execution recipe, the software service to be called.

Example 3 includes the method of example 2, wherein the information collected from the registry includes an array of FAPI objects and an array of corresponding system API (SAPI) objects.

Example 4 includes the method of example 2, wherein the information collected from the registry includes a value representing a number of software layers to be used to establish the connection, and further including software dependencies between the software layers, and software libraries to be used in establishing the connection.

Example 5 includes the method of example 2, wherein the registry is a software library dependency registry.

Example 6 includes the method of example 2, wherein the registry includes a catalog of FAPIs and corresponding system APIs (SAPIs) for use in composing the API execution recipe at runtime.

Example 7 includes the method of example 1, wherein the connection is represented by a functional application programming interface between the software layer and the microservice.

Example 8 includes the method of example 1, wherein the microservice is implemented with hardware and performs a computational task.

Example 9 includes the method of example 1, wherein the composing of the API execution recipe occurs at runtime.

Example 10 includes the method of example 1, wherein the connection defined by the API execution recipe is to be used by any of a plurality of software development tools residing at the software layer.

Example 11 includes the method of example 1, wherein the API execution recipe is dependent on a hardware platform associated with the microservice to be exposed to the software layer.

Example 12 includes an apparatus comprising a processor, and instructions to cause at least one processor to compose an application programming interface (API) execution recipe based on functional API (FAPI) information, system API (SAPI) information, a FAPI library, and a SAPI library, the FAPI information, the SAPI information, a FAPI library and a SAPI library obtained from a feature registry, initialize software services identified in the API execution recipe, validate a pathway between a microservice feature and the software layer, the pathway defined by the API execution recipe, and supply the API execution recipe in software executable code to an integrated design environment at a software layer, when the pathway is valid, the integrated design environment to compile the software executable code to generate executable binary code, and the executable binary code, when executed, to expose a microservice to the software layer.

Example 13 includes the apparatus of example 12, wherein the FAPI information includes an array of Functional API objects and the SAPI information includes an array of corresponding SAPI objects.

Example 14 includes the apparatus of example 12, wherein to compose the API execution recipe the at least one processor is to determine a number of software layers to be included in the API execution recipe, identify software dependencies between the software layers, and initialize the FAPI and SAPI libraries.

Example 15 includes the apparatus of example 12, wherein the executable binary code, when executed, generates a microservice interface, the microservice interface to expose the microservice to the software layer.

Example 16 includes the apparatus of example 12, wherein a microservice is to perform a computational task.

Example 17 includes the apparatus of example 12, wherein the registry is a software library dependency registry.

Example 18 includes the apparatus of example 12, wherein the processor is to compose the API execution recipe at runtime.

Example 19 includes the apparatus of example 12, wherein the registry includes a catalog of FAPIs and corresponding SAPIs.

Example 20 includes At least one non transitory computer readable medium comprising computer readable instructions, that when executed, cause at least one processor to at least compose an application programming interface (API) execution recipe based on the results of a query of a FAPI and SAPI registry, the query to identify a microservice to be exposed to a software layer of a compute system, and initialize software services and libraries identified in the API execution recipe, validate components included in a pathway from a software layer to a microservice, the pathway defined by the API execution recipe, convert the API to executable software code, the executable software code to be compiled to create executable binary code that, when executed, exposes the microservice to the software layer.

Example 21 includes the non-transitory computer readable medium of example 20, wherein the computer readable instructions cause the at least one processor to provide the executable software code to an integrated design environment for compilation.

Example 22 includes the non-transitory computer readable medium of example 20, wherein the FAPI information and the SAPI information include an array of FAPI objects and an array of corresponding SAPI objects, respectively.

Example 23 includes the non-transitory computer readable medium of example 20, wherein to compose the API recipe, the instructions cause the processor to determine a number of software layers to be included in the API execution recipe, identify software dependencies between the software layers, and initialize the FAPI and SAPI libraries.

Example 24 includes the non-transitory computer readable medium of example 20, wherein the microservice performs a computational task.

Example 25 includes the non-transitory computer readable medium of example 20, wherein the instructions cause the processor to compose the API execution recipe at runtime.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
    querying a functional application programming interface (FAPI) registry to obtain a collection of software services and corresponding execution recipes;
    composing an API execution recipe after the querying, the API execution recipe based on the collection of software services and the corresponding execution recipe;

identifying, based on the API execution recipe, a software service to be called, the software service among the collection of software services;

initializing the software service to be called; and checking, by executing an instruction with at least one processor circuit, a connection between a software layer and a microservice, the connection defined by the API execution recipe, and the connection to expose the microservice to the software layer.

2. The method of claim 1, wherein information collected from the registry includes an array of FAPI objects and an array of corresponding system API (SAPI) objects.

3. The method of claim 1, wherein information collected from the registry includes a value representing a number of software layers to be used to establish the connection, and the information including:

software dependencies between the software layers; and
software libraries to be used in establishing the connection.

4. The method of claim 1, wherein the registry is a software library dependency registry.

5. The method of claim 1, wherein the registry includes a catalog of FAPIs and corresponding system APIs (SAPIs) for use in composing the API execution recipe at runtime.

6. The method of claim 1, wherein the connection is represented by a functional application programming interface between the software layer and the microservice.

7. The method of claim 1, wherein the microservice is implemented with hardware and performs a computational task.

8. The method of claim 1, wherein the composing of the API execution recipe occurs at runtime.

9. The method of claim 1, wherein the connection defined by the API execution recipe is to be used by any of a plurality of software development tools residing at the software layer.

10. The method of claim 1, wherein the API execution recipe is dependent on a hardware platform associated with the microservice to be exposed to the software layer.

11. An apparatus comprising:
instructions; and
at least one processor circuit to be programmed by the instructions to:
compose an application programming interface (API) execution recipe based on functional API (FAPI) information, system API (SAPI) information, a FAPI library, and a SAPI library, the FAPI information, the SAPI information, the FAPI library and the SAPI library obtained from a feature registry;
initialize software services identified in the API execution recipe;
validate a pathway between a microservice feature and a software layer, the pathway defined by the API execution recipe; and
supply the API execution recipe in software executable code to an integrated design environment at the software layer when the pathway is valid, the integrated design environment to compile the software executable code to generate executable binary code, and the executable binary code, when executed, to expose a microservice to the software layer.

12. The apparatus of claim 11, wherein the FAPI information includes an array of FAPI objects and the SAPI information includes an array of corresponding SAPI objects.

13. The apparatus of claim 11, wherein to compose the API execution recipe, one or more of the at least one processor circuit is to:
determine a number of software layers to be included in the API execution recipe;
identify software dependencies between the software layers; and
initialize the FAPI and SAPI libraries.

14. The apparatus of claim 11, wherein the executable binary code, when executed, generates a microservice interface, the microservice interface to expose the microservice to the software layer.

15. The apparatus of claim 11, wherein the microservice is to perform a computational task.

16. The apparatus of claim 11, wherein the feature registry is a software library dependency registry.

17. The apparatus of claim 11, wherein one or more of the at least one processor circuit is to compose the API execution recipe at runtime.

18. The apparatus of claim 11, wherein the feature registry includes a catalog of FAPIs and corresponding SAPIs.

19. At least one non-transitory computer readable medium comprising computer readable instructions to cause at least one processor circuit to at least:
compose an application programming interface (API) execution recipe based on results of a query of a FAPI and SAPI registry, the query to identify a microservice to be exposed to a software layer of a compute system;
initialize software services and libraries identified in the API execution recipe;
validate components included in a pathway from the software layer to the microservice, the pathway defined by the API execution recipe; and
convert the API execution recipe to executable software code, the executable software code to be compiled to create executable binary code that, when executed, exposes the microservice to the software layer.

20. The at least one non-transitory computer readable medium of claim 19, wherein the computer readable instructions cause one or more of the at least one processor circuit to provide the executable software code to an integrated design environment for compilation.

21. The non-transitory computer readable medium of claim 19, wherein the FAPI and the SAPI registry includes an array of FAPI objects and an array of corresponding SAPI objects, respectively.

22. The at least one non-transitory computer readable medium of claim 19, wherein to compose the API recipe, the instructions cause one or more of the at least one processor circuit to
determine a number of software layers to be included in the API execution recipe;
identify software dependencies between the software layers; and
initialize FAPI and SAPI libraries.

23. The at least one non-transitory computer readable medium of claim 19, wherein the microservice performs a computational task.

24. The at least one non-transitory computer readable medium of claim 19, wherein the instructions cause one or more of the at least one processor circuit to compose the API execution recipe at runtime.

* * * * *